(12) United States Patent
Skaff (10) Patent No.: US 9,082,071 B2
(45) Date of Patent: Jul. 14, 2015

(54) MATERIAL CLASSIFICATION USING OBJECT/MATERIAL INTERDEPENDENCE WITH FEEDBACK

(71) Applicant: CANON KABUSHIKI KAISHA, Tokyo (JP)

(72) Inventor: Sandra Skaff, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 14/090,751

(22) Filed: Nov. 26, 2013

(65) Prior Publication Data

US 2015/0144537 A1    May 28, 2015

(51) Int. Cl.
| | |
|---|---|
| G06K 9/00 | (2006.01) |
| G06N 7/00 | (2006.01) |
| B07C 5/34 | (2006.01) |
| G06F 17/18 | (2006.01) |
| G06N 99/00 | (2010.01) |

(52) U.S. Cl.
CPC ........ G06N 7/005 (2013.01); B07C 5/34 (2013.01); G06F 17/18 (2013.01); G06N 99/005 (2013.01)

(58) Field of Classification Search
CPC ............ G06K 9/00577; G06K 9/4671; G06K 9/6229; G06K 9/6297; G06K 9/62; G06K 9/00; A61B 5/0075; H04N 5/2254; H04N 5/2256; H04N 5/2354; H04N 9/045; H04N 9/73; G01J 3/2823
USPC ......................................................... 382/141
See application file for complete search history.

(56) References Cited

U.S. PATENT DOCUMENTS

| | | | |
|---|---|---|---|
| 6,272,242 B1 * | 8/2001 | Saitoh et al. | 382/187 |
| 6,400,996 B1 * | 6/2002 | Hoffberg et al. | 700/83 |
| 7,449,655 B2 | 11/2008 | Cowling | |
| 2008/0157940 A1 * | 7/2008 | Breed et al. | 340/425.5 |
| 2011/0243450 A1 * | 10/2011 | Liu | 382/190 |
| 2014/0201126 A1 * | 7/2014 | Zadeh et al. | 706/52 |

OTHER PUBLICATIONS

Liu, C.; Sharan, L.; Adelson, E. and Rosenhltz. R., "Exploring Features in a Bayesian Framework for Material Recognition", IEEE Conference on Computer Vision and Pattern Recognition, 2012.
Hu, D.J., Bo, L. and Ren, X., Toward Robust Material Recognition for Everyday Objects, British Machine Vision Conference, 2011.
Perronnin, F. and Dance, C., "Fisher Kernels on Visual Vocabularies for Image Categorization", IEEE Conference on Computer Vision and Pattern Recognition, 2007.

(Continued)

*Primary Examiner* — Ali Bayat
(74) *Attorney, Agent, or Firm* — Fitzpatrick, Cella, Harper & Scinto (57) ABSTRACT

The present disclosure relates to classification of a material type of an object. A first phase applies an object classifier and a material classifier to obtain first object and material probabilities of the object. A second phase applies an interdependent object/material classifier to the first object and material probabilities to obtain further object and material class probabilities. The interdependent object/material classifier performs multiple iterations of calculating the further object and material class probabilities, and utilizes feedback in which an immediately preceding calculated prior further object class probability is included in a next iteration of calculating a further material class probability, and an immediately preceding calculated prior further material class probability is included in a next iteration of calculating a further object class probability.

18 Claims, 5 Drawing Sheets

(56) References Cited

OTHER PUBLICATIONS

Wang, O.; Gunawardane, P.; Scher, S. and Davis, J., "Material classification using BRDF slices", IEEE Conference on Computer Vision and Pattern Recognition, 2009.

Torralba, A., "Contextual Priming for Object Detection", International Journal of Computer Vision 53(2), 169-191, 2003.

Goedeme, T., "Towards Embedded Waste Sorting—Using Constellations of Visual Words", De Nayer Technical University, Embedded System Design (EmSD), 2008.

U.S. Appl. No. 13/887,163, filed May 3, 2013.

* cited by examiner

MATERIAL CLASSIFICATION USING OBJECT/MATERIAL INTERDEPENDENCE WITH FEEDBACK

FIELD

The present disclosure relates to the classification of a material for an object, and more particularly relates to the classification of an object and its material using interdependence between object classification and material classification probabilities, with feedback between them.

BACKGROUND

In the field of object and material classification, an object classifier has generally been used to classify an object type from among a plurality of candidate object types. For example, an image of an object may be used to classify an object type by referring to a training set of object images. Additionally, a material classifier has generally been used to classify an unknown material into one of multiple material types. A material classifier may generally be based on an observed physical property used to differentiate different material types.

The Perceptual Sciences Group at Massachusetts Institute of Technology developed an image database for studying human material categorization, known as the Flickr Material Database (FMD). Attempts to improve on object and/or material classification utilizing the FMD have been made.

CITATIONS

1. Liu, C.; Sharan, L.; Adelson, E. and Rosenhltz. R., "Exploring Features in a Bayesian Framework for Material Recognition", IEEE Conference on Computer Vision and Pattern Recognition, 2012.
2. Hu. D. J., Bo, L. and Ren, X., "Toward Robust Material Recognition for Everyday Objects", British Machine Vision Conference, 2011.
3. Perronnin, F. and Dance, C., "Fisher Kernals on Visual Vocabularies for Image Categorization", IEEE Conference on Computer Vision and Pattern Recognition, 2007.
4. Wang, O.; Gunawardane, P.: Scher, S. and Davis, J., "Material classification using BRDF slices", IEEE Conference on Computer Vision and Pattern Recognition, 2009.

In citation [1] to Liu et al., an approach to improve object recognition used low and mid-level features that capture various aspects of material appearance. The authors proposed an augmented Latent Dirichlet Allocation (aLDA) model to combine the features under a Bayesian generative framework to learn an optimal combination of features. Their approach was able to somewhat improve material recognition. However, the maximum recognition rate achieved by citation [1] was about 45%.

In citation [2] to Hu et al., the authors used a Kernel Descriptor framework and extended the set of descriptors to include material-motivated attributes using variances of gradient orientation and magnitude. The authors were able to improve the accuracy of object recognition on the Flickr dataset from 45% to 54%. The authors also introduced two new datasets using ImageNet and macro photos. Because ImageNet material dataset includes both material and object labels, the authors first ran the object recognizer using the Kernel descriptors and then used the (soft SVM) outputs from the object recognizer and added them as input to the material recognizer This approach improved the material recognition accuracy by about 10% (i.e., to a best case of about 64%).

Thus, while some improvements have been made in material recognition, a best case recognition percentage of 64% still results in about than 3 out of 10 objects being misclassified or not being able to be classified at all. Therefore, there still exists a need to continue to improve the recognition probabilities of objects and materials.

SUMMARY

The present disclosure describes a technique that improves on object/material recognition. In particular, the present disclosure implements interdependency between a particular object class and a particular material class, and also implements feedback between object classification and material classification so as to improve the accuracy of both.

In one representative embodiment disclosed herein, object and material classification may be implemented in a recycling system for sorting recyclable items, such as bottles or ink cartridges. Such a recycling system may, for instance, include a conveyor system for conveying recyclable objects to a material classification position. At the material classification position, one or more cameras and lighting systems may be installed to capture an image of the recyclable object to be classified and then sorted to a respective processing bin or station. That is, if the object is a plastic bottle, the system may capture an image of the plastic bottle and obtain various classification elements, such as an outline of the shape of the object, or material properties of the object such as interreflectance. The object is then classified according to the present disclosure and the classified object is sorted to its respective bin or processing station.

In classifying the object and its material, according to the present disclosure, a first classification phase is conducted in which an object classifier is applied to the object to obtain first object class probabilities of the object belonging to respective different object classes. That is, the object classifier of the first phase obtains, using a dataset for example, the probability of the object being a bottle, a cartridge, or some other type of pre-defined object class. The first phase of the classification also applies a material classifier to the object to obtain first material class probabilities of a material type of the object belonging to respective different material classes. That is, the material classifier of the first phase obtains, using a dataset or training data for example, probabilities of the object being made of plastic, glass, metal, or any other material type that may be included in the classification system. Here, in the first phase, both the object classifier and the material classifier can be a known classifier to obtain the first probabilities, but known classifiers with greater accuracy would generally provide a better starting point for classifying the object and its material. Of course, it is probable that either the object classifier or the material classifier of the first phase are not able to determine the object or material type with any amount of certainty (for example, it may result in a 33.33% probability of the object being made of either plastic, glass, or metal), and the present disclosure provides a technique for resolving this uncertainty.

Once the first object and material probabilities are obtained in the first phase, a second classification phase is conducted to further refine the first object and material probabilities in order to more accurately classify the object and its material. In the second phase, according to the present disclosure, an interdependent object/material classifier is implemented, where the interdependent object/material classifier employs feedback between the object classification and the material classification.

In one embodiment disclosed herein, a Bayesian algorithm may be employed in which a prior calculated probability is used as part of the calculation for the next probability. As such, according to the present disclosure, the first object class probabilities obtained from the object classifier of the first phase are used to obtain further material class probabilities, and the first material class probabilities obtained via the material classifier of the first phase are used to obtain further object class probabilities. Thus, for example, a first object class probability of 40% that the object is a bottle may be used as a prior to calculate the next material probability. Similarly, a first material class probability of 33.33% that the object is plastic may be used as a prior to calculate the next object probability. It is noted here, however, that, according to the present disclosure, the result of the next probability calculation for the material by the interdependent classifier is used as a prior for the next probability calculation for the object, and vice versa. Thus, as will be described in more detail herein, the present disclosure utilizes feedback between the next object and material calculations from the prior object or material calculation.

In the present disclosure, the interdependent object/material classifier applies a pre-defined set of object/material interdependent weighting functions (i.e., likelihood functions) for calculating the further object class probabilities, and also applies a pre-defined set of material/object interdependent functions for calculating the further material class probabilities. In other words, in calculating the next object probability, the calculation takes into account a likelihood of the object belonging to a particular object class/material class combination based on the general knowledge of the types of materials that particular objects are commonly made of. By way of example, it may be generally known that bottles are commonly made of plastic and glass, but it is less likely that a bottle will be made of metal, and it would be very unlikely that a bottle would be made of wood. Therefore, a likelihood function of a metal/bottle combination would be weighted in favor of a lower probability than likelihood functions for plastic/bottle or glass/bottle combinations, while a likelihood function for a wood/bottle may be weighted to an even lower probability. Thus, the likelihood functions included in the calculations for the next probability bias the results in favor of, or against, particular object/material combinations.

Continuing with the present disclosure of the interdependent object/material classifier, multiple iterations of calculating the further object class probabilities and multiple iterations of calculating the further material class probabilities are performed, with feedback between them where an immediately preceding calculated prior further object class probability is included in a next iteration of calculating a further material class probability, and an immediately preceding calculated prior further material class probability is included in a next iteration of calculating a further object class probability. As one example disclosed herein, a Bayesian algorithm may be implemented to calculate the next material probability of the object being plastic. Such a calculation may be a summation of respective material/object likelihood functions multiplied by the prior object probability for each respective object. Here, in a first iteration of the interdependent object/material classifier, the prior object probability used to calculate the next material probability may be the object probability obtained by the first phase object classifier. The result of the calculation is a next material probability for the particular material in question, and this result is then used in the next calculation of the object class by the interdependent object/material classifier. That is, the next object class calculation may be a summation of respective object/material likelihood functions multiplied by the prior material probability for each respective material, where the prior used in this calculation is the result from the immediately preceding material calculation by the interdependent object/material classifier. The result of this object class iteration is then used as the next prior in the next material class calculation, which includes a recalculation of the likelihood functions using the prior. Thus, according to the present disclosure, each object class calculation is interdependent upon the result of the previous material class calculation, and vice versa. As a result, the present disclosure provides a two-step interdependent object and material classifier with feedback, and a more accurate probability can achieved for both.

In the embodiments of the present disclosure, following each iteration of calculating the further object class probability, and each iteration of calculating the further material class probability, a determination may be made whether the respective object class and material class probabilities meet a predetermined probability value. If so, then the iterations of the object/material classifier are terminated. On the other hand, in a case where it is determined that the predetermined probability value is not met, the interdependent object/material classifier continues the object class iterations and the material class iterations sequentially until a) it is determined that the value has been met, b) a predetermined number of iterations has been met, or c) a predetermined change amount in the probability between iterations has been met.

In one embodiment disclosed herein, the first object class probabilities and the first material class probabilities may be based on training data. In another embodiment, the first object class probabilities and the first material class probabilities may be calculated using a technique selected from the group which includes support vector machines (SVM), neural networks, Gaussian mixture modeling, and K-means clustering. In yet another embodiment, the object classifier in the first phase comprises derivation of descriptors followed by object classification using the descriptors, and the derivation of descriptors may comprise derivation of low level descriptors including color and scale-invariant-feature-transformation (SIFT). Alternatively, the derivation of descriptors includes derivation of high level descriptors including one of bag-of-visual-words (BOV) descriptors and Fisher vectors (FV)(See, e.g., citation [3].). In yet a further embodiment, the object classifier in the first phase is selected from the group which includes discriminative classification and generative classification.

As for the material classifier in the first phase, in one embodiment disclosed herein, it may comprise discriminative classification in which bidirectional reflectance distribution function (BRDF) features are extracted from the object followed by support vector machine (SVM) material classification based on the extracted BRDF features. In another embodiment, the material classifier in the first phase may comprise discriminative classification in which spectral features are extracted from the object based on estimations of spectral reflectance from the object followed by probability calculations as to most likely material classification based on the extracted spectral features. (See, e.g., citation [4].)

This brief summary has been provided so that the nature of this disclosure may be understood quickly. A more complete understanding can be obtained by reference to the following detailed description and to the attached drawings.

DETAILED DESCRIPTION

Figure 1:
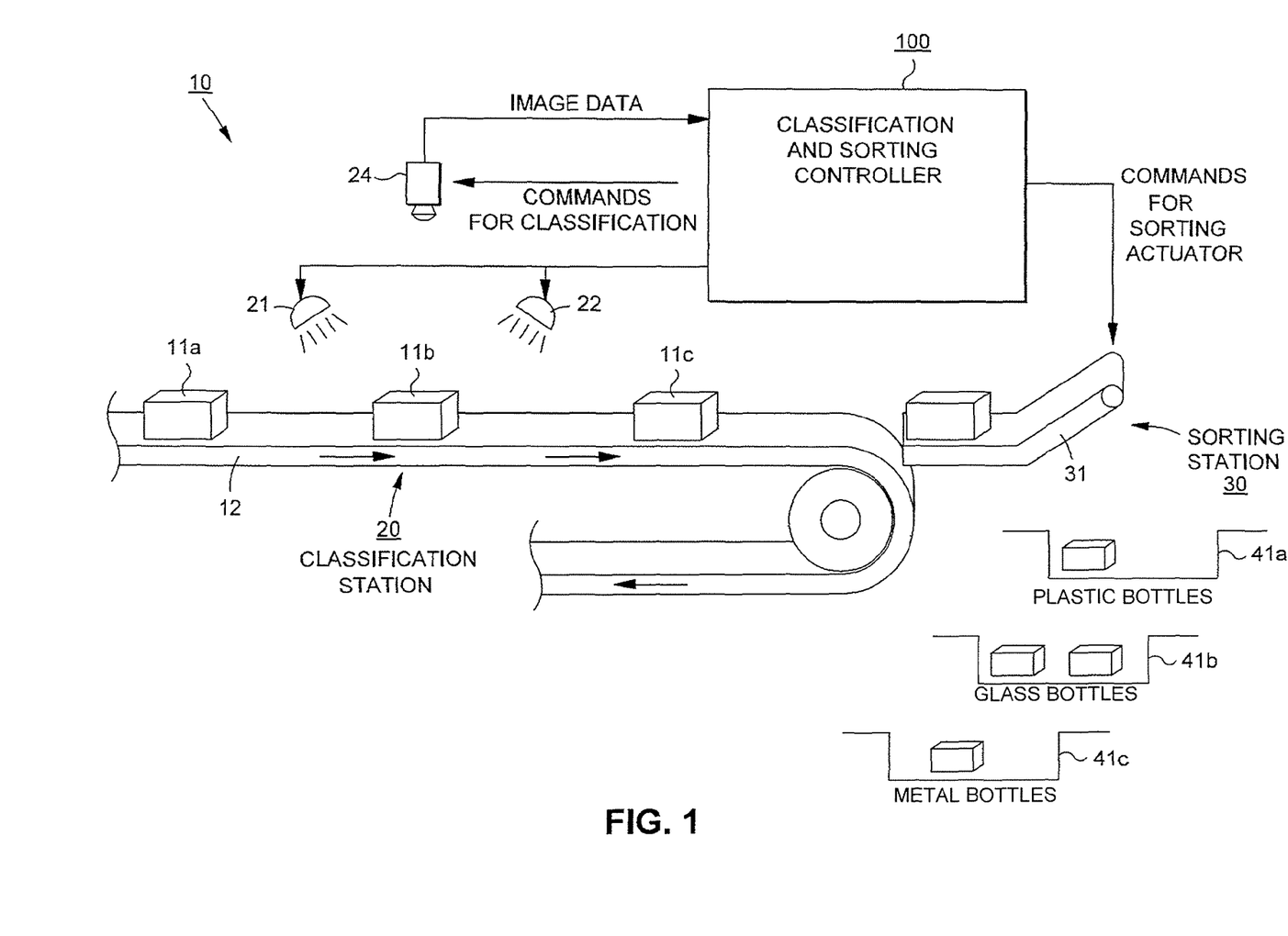
FIG. 1 is an example embodiment of a classification system according to the description herein, in the form of a recycling system in which objects to be recycled are classified according to their respective object type and the materials from which the objects are fabricated, and the classified objects are sorted for recycling according to their material classification.

FIG. 1 is an example embodiment of a classification system according to the description herein, in the form of a recycling system 10 in which objects to be recycled are classified according to their object type and according to the materials from which the objects are fabricated, and the classified objects are then sorted for recycling according to their object/material classification.

While FIG. 1 depicts a recycling and/or sorting environment, it should be understood that this is simply an example environment in which the disclosure may be practiced, and that other environments or embodiments are of course possible. For example, material classification could also be used in the context of manufacturing, quality control, image retrieval and security, among many others.

As shown in FIG. 1, objects 11a, 11b, etc. are preferably conveyed on a conveyor mechanism 12 to a classification station 20, where the objects are classified according to their object type and material, and then to a sorting station 30, where the objects are sorted, re-routed, or otherwise processed according to their object classification and material classification. It should be understood that conveyor mechanism 12 is simply an example mechanism for moving objects, and other mechanisms, such as other robotic mechanisms, may be employed. In addition, although FIG. 1 depicts three objects, any number of objects may appear on conveyor mechanism 12 at a time.

Classification station 20 preferably includes plural light sources 21 and 22, together with an image capture device 24 for capturing images of objects positioned at classification station 20. In some example embodiments, an object at the classification station is illuminated individually by each of the plural light sources under control of classification and sorting controller 100, and image capture device 24 captures one or more images for each individual illumination. Under control of the classification and sorting controller 100, a classification is made of the type of object and the material from which the object is fabricated, in accordance with the present disclosure.

Conveyor mechanism 12 continues to convey the object to sorting station 30, where sorting actuator 31 sorts the objects according to their classified object type (e.g., bottle, cartridge, etc.) and further according to its material classification (e.g., plastic bottle, glass bottle, plastic cartridge, etc.). Sorting is controlled by classification and sorting controller 100, which commands actuator mechanism 31 to sort the classified objects into one of multiple receptacles 41a, 41b and 41b. Here, while FIG. 1 depicts receptacles 41a-41c for bottles made of different materials, it can readily be understood that additional receptacles (not shown) may also be included for other types of objects (e.g., cans, jars, paper, fabric, etc.) and their respective materials.

In this example embodiment, object classification differentiates between different types of objects that can be classified according to their general shape, while material classification differentiates between different types of materials from which the objects are fabricated, such as metal, plastic, glass, paper and fabric. Naturally, it will be understood that this is a non-limiting example. In other embodiments, material classification could differentiate between different types of metals such as steel, brass, copper and aluminum, or between different types or colors of plastics and glass, and so forth, or between any and all of these. In addition, other embodiments might include a classification category of "unknown", signifying that object and/or material classification did not succeed with a given confidence level, with a corresponding receptacle for which further processing such as manual sorting is then required.

In FIG. 1, image capture device 24 is shown as a digital still camera or a digital video camera. It is understood, however, that the following description encompasses arbitrary arrangements which can incorporate or utilize imaging assemblies with capture optics, for instance, a data processing apparatus having an image sensing function (e.g., a personal computer) or a portable terminal having an image sensing function.

It should be also understood that controller 100 may be included in a computer, the computer generally comprising a programmable general purpose computer having an operating system, such as Microsoft® Windows® or Apple® Mac OS® or LINUX, and which is programmed as described below so as to perform particular functions and, in effect, become a special purpose computer when performing these functions.

In some embodiments, the computer may be a mobile computer. In addition, computing equipment for practicing aspects of the present disclosure can be implemented in a variety of embodiments. For example, in some embodiments, the functionality of controller 100 may be incorporated into image capture device 24. In other embodiments, the computer may comprise, for example, a desktop computer, a network server or a computing cluster, or may include an imaging device instead of communicating with a separate image capture device 24. Other embodiments are possible according to the application and environment.

Figure 2:
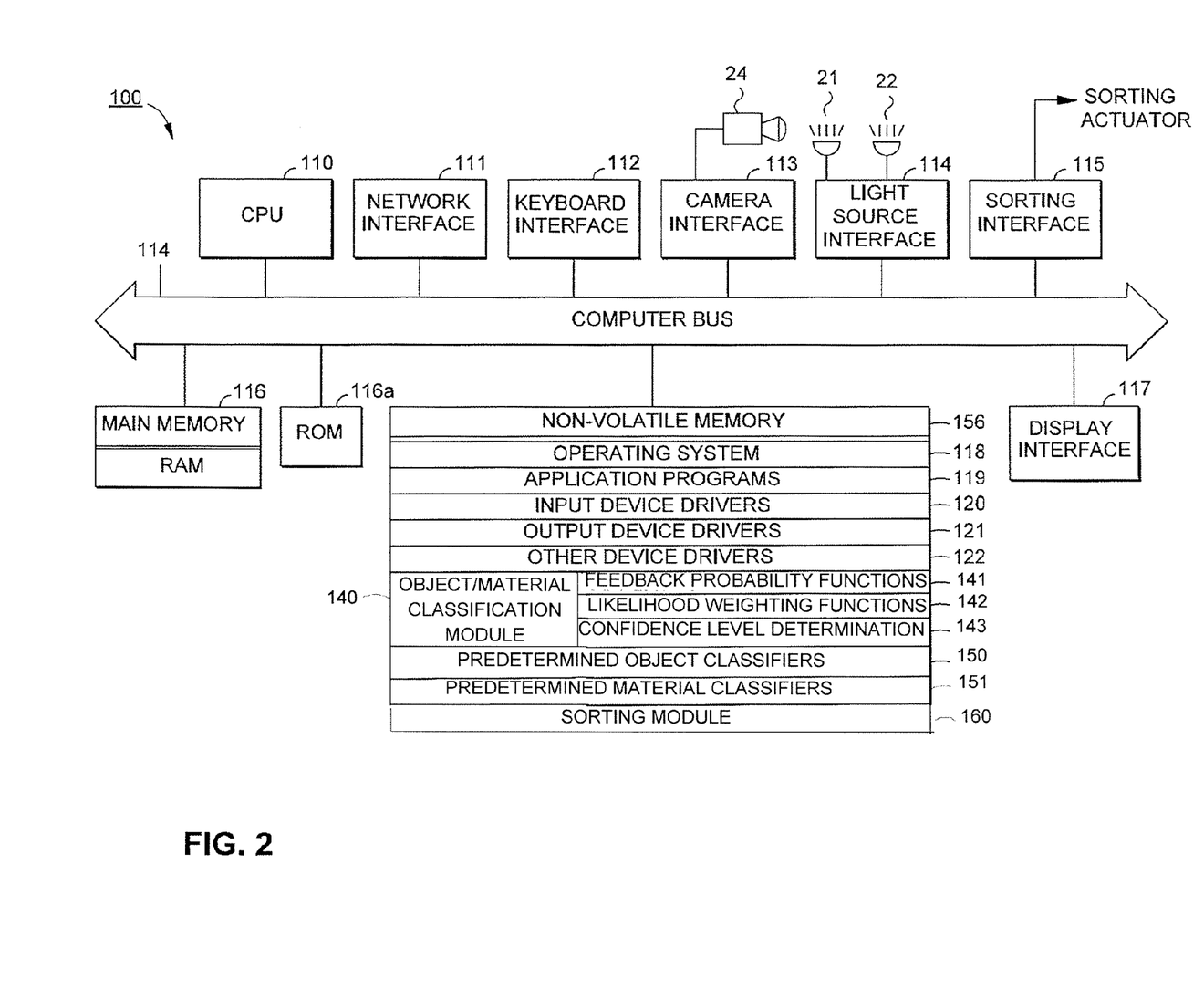
FIG. 2 is a view for explaining the architecture of a computerized classification and sorting controller according to the present disclosure.

FIG. 2 is a view for explaining the general structural elements and software architecture of classification and sorting controller 100 that may be used in practicing the present disclosure.

As shown in FIG. 2, classification and sorting controller 100 includes central processing unit (CPU) 110 which interfaces with computer bus 114. Also interfacing with computer bus 114 are non-volatile memory 156 (e.g., a hard disk or other non-volatile storage medium), network interface 111, keyboard interface 112, camera interface 113, random access memory (RAM) 116 for use as a main run-time transient memory, read only memory (ROM) 116a, and display interface 117 for a display screen or other output.

RAM 116 interfaces with computer bus 114 so as to provide information stored in RAM 116 to CPU 110 during execution of the instructions in software programs, such as an operating system, application programs, image processing modules, and device drivers. More specifically, CPU 110 first loads computer-executable process steps from non-volatile memory 156, or another storage device into a region of RAM 116. CPU 110 can then execute the stored process steps from RAM 116 in order to execute the loaded computer-executable process steps. Various types of data can also be stored in RAM 116 so that the data can be accessed by CPU 110 during the execution of the computer-executable software programs, to the extent that such software programs have a need to access and/or modify the data.

It can also be readily understood that, rather than storing software programs for performing object/material classification in non-volatile memory 156, such programs may instead be included on a removable storage medium (e.g., Flash drive,) on which the program codes can be stored and read by CPU 110. In such a case, classification and sorting controller 100 may include an interface for an external drive (not shown) in which the removable storage medium may be inserted. It can also be readily understood that the software programs may be stored on a server connected to the classification and sorting controller via a network (i.e., via the cloud). In this case, cloud computing may be implemented in which the controller 100 accesses the server (not shown) via network interface 111 to execute the classification according to the disclosure. Such a cloud environment may provide the ability to maintain an updated database of predetermined classification modules that may be used as an initial classification operation, as will be discussed in more detail below.

As also shown in FIG. 2, non-volatile memory 156 contains computer-executable process steps for operating system 118, and application programs 119, such as graphic image management programs. Non-volatile memory 156 also contains computer-executable process steps for device drivers for software interface to devices, such as input device drivers 120, output device drivers 121, and other device drivers 122.

Non-volatile memory 156 also stores an object/material classification module 140, predetermined object classifiers 150, predetermined material classifiers 151 and sorting module 160. The object/material classification module 140 and the sorting module 160 comprise computer-executable process steps for performing object and material classification of an object fabricated from a particular material, and for sorting the object based on the object and material classification. As shown in FIG. 2, material classification module 140 generally comprises probability functions 141, likelihood weighting functions 142 and a confidence level determination unit 143, each of which will be discussed in more detail below.

Non-volatile memory 156 is also seen to include predetermined object classifiers 150 and predetermined material classifiers 151 which generally comprise known classifiers such as those described in the literature of citations [3] and [4] above. In other embodiments, the predetermined object classifiers may attempt to classify object images captured by image capture device 24 by computing image representations using low-level descriptors, such as SIFT+color (Scale Invariant Feature Transform (SIFT)), or high-level descriptors such as Bag-Of-Visual words (BOV) or Fisher Vectors. A given generative classifier such as a Gaussian Mixture Model (GMM), or a discriminative classifier such as SVM (Support Vector Machine), for each new image, the image representation is computed and input to the classifier to obtain an object label. As for the predetermined material classifiers 151, they may be based on discriminative learning (SVM) by, for example, capturing BRDF (Bi-directional Reflectance Distribution Function) slices to extract features, or may be based on, for example, colorimetric and spectral material estimation as described in U.S. patent application Ser. No. 13/887,163, filed on May 3, 2013, the contents of which are hereby incorporated by reference. These predetermined classifiers generally obtain an initial object classification and/or material classification probabilities which the present disclosure utilizes as an initial input for further processing using interdependence and feedback so as to obtain a greater confidence level than that obtained by the predetermined classifiers. The further processing using interdependence and feedback will be discussed in more detail below.

Returning to FIG. 2, in some example embodiments, the object/material classification module 140 also includes a corresponding plurality of modules (not shown) for control of the light sources, for control of the camera(s) and for gathering of image data of such camera(s), a module for derivation of feature vectors according to a feature vector algorithm, such as feature vectors based on texture discrimination, spectral signature, BRDF, and a bidirectional surface scattering reflectance distribution function.

Sorting module 160 for its part includes a corresponding plurality of modules (not shown) related to input of object and material classification from the object/material classification module 140, and actuation of the sorting mechanism 31 based on the object type and material type classification.

The computer-executable process steps for these modules may be configured as part of operating system 118, as part of an output device driver in output device drivers 121, or as a stand-alone application program. These modules may also be configured as a plug-in or dynamic link library (DLL) to the operating system, device driver or application program. It can be appreciated that the present disclosure is not limited to these embodiments and that the disclosed modules may be used in other environments.

Figure 3:
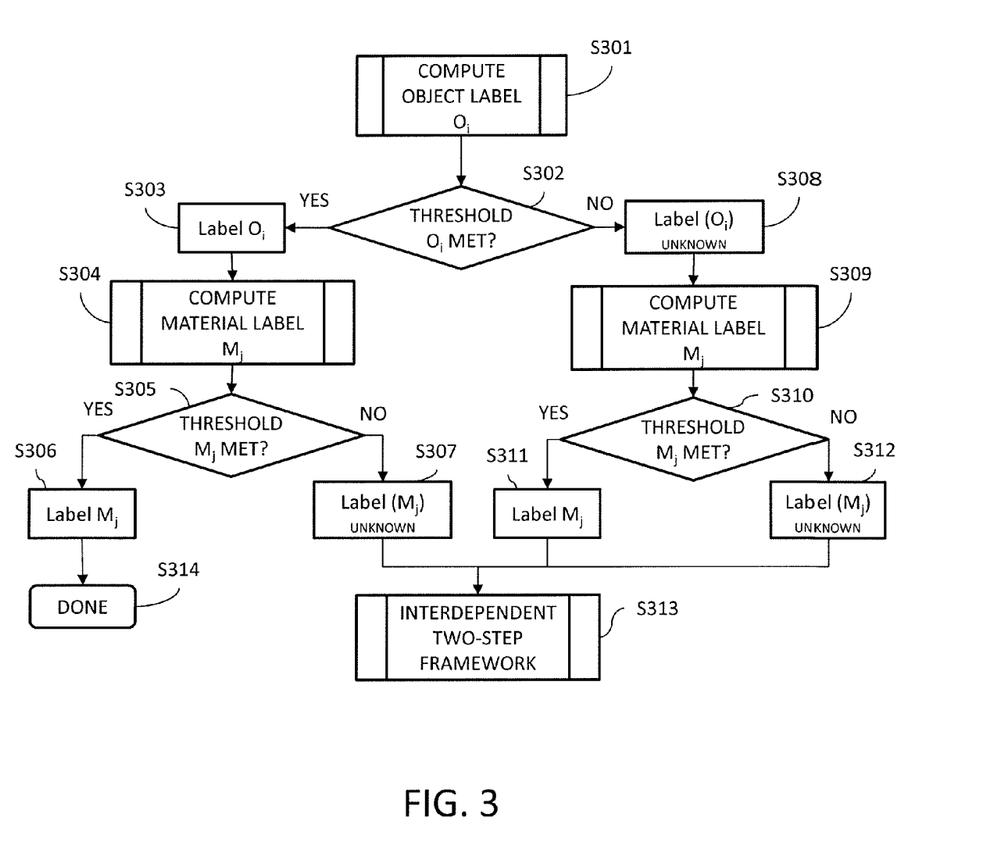
FIG. 3 depicts a flow chart of a two-step framework for object/material classification according to the present disclosure.

FIG. 3 depicts a flow chart of a two-step framework for object/material classification according to the present disclosure. In general, the two-step framework attempts to classify an object and attempts to classify the material of the object. If neither the object nor the material of the object can be classified to a desired confidence level using given object and material classifiers, the interdependent two-step framework with feedback connections is employed to further attempt to classify the object and its material with a greater degree of confidence.

In the framework of FIG. 3, an image of the object is captured at the classification station 20 by image capture device 24. Commands for capturing the image, as well as commands for controlling lighting sources 21 and 22 are provided by classification and sorting controller 100. As discussed above, multiple images may be captured under different lighting conditions in order to obtain different types of input values (e.g., shape vectors, texture, reflectance values, etc.) for classifying the object. These processes are a precursor to step S301 of FIG. 3, as would be readily understood by those skilled in the art.

Figure 4:
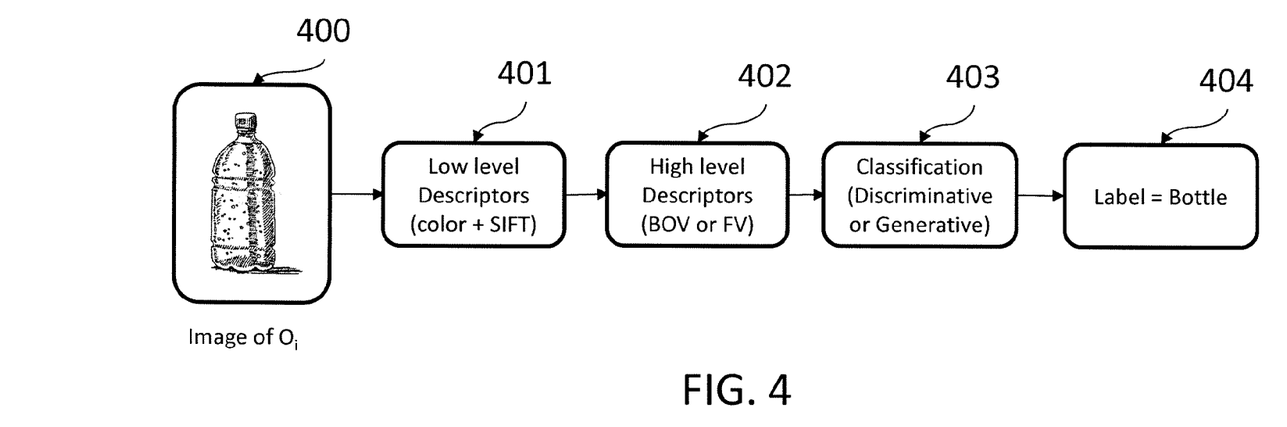
FIG. 4 depicts an example object classification.

In step S301, an object classifier is used to compute an object label of the object. Here, known classifiers are used and the type of classifier employed is merely a matter of system preference and may be based on the expected types of objects and materials that the recycling system may process. Thus, various best performing classifiers would be chosen to perform the initial classifications. One example of a known material classifier that may be employed is depicted in FIG. 4. As seen in FIG. 4, an image 400 of an object (in this case, a plastic bottle) is obtained. The classifier computes low level descriptors 401, which can be color and SIFT (Scale-Invariant Feature Transform) features, although other types of features can also be used. The low level descriptors 401 are then aggregated to form a high-level descriptor 402 or image representation, such as BOV (Bag of Visual Words) or FV's (Fisher Vectors). These representations have shown to provide state of the art performance in image classification tasks.

The BOV representation can be computed as follows. Given features or low-level descriptors from all the training images, a model is learned such as a GMM (Gaussian Mixture Model). Each Gaussian corresponds to one word of the visual vocabulary. Alternatively, K-means clustering can be used to construct the visual vocabulary. Each image can then be represented using a histogram of occurrences for each visual word. The BOV representations, however, have been known to have limitations and thus, FV's were introduced. The FV's are applied to the visual vocabulary as follows.

$X=\{x_t, t=1 \ldots T\}$ denotes the set of low-level features extracted from an image, and the visual vocabulary is represented by a GMM with a set of parameters $\lambda$. Here, $\lambda=\{w_i, \mu_i, \Sigma_i, i=1 \ldots N\}$ where $w_i, \mu_i, \Sigma_i$ denote respectively the weight, mean, and covariance matrix of Gaussian i and where N denotes the number of Gaussians. Independence of Gaussians is assumed and therefore, it can be written that:

$$L(X|\lambda) = \log p(X|\lambda) = \sum_{t=1}^{T} \log p(x_t|\lambda)$$

where $p(x_t|\lambda)$ denotes the likelihood that observation $x_t$ was generated by the GMM. The partial derivatives of $L(X|\lambda)$ with respect to $w_i$, $\mu_i$ and $\Sigma_i$ can be derived and can be written as follows:

$$\frac{\partial L(X|\lambda)}{\partial w_i} = \sum_{t=1}^{T}\left[\frac{\gamma_t(i)}{w_i} - \frac{\gamma_t(1)}{w_1}\right], \text{ for } i \geq 2,$$

$$\frac{\partial L(X|\lambda)}{\partial \mu_i^d} = \sum_{t=1}^{T} \gamma_t(i)\left[\frac{x_t^d - \mu_i^d}{(\sigma_i^d)^2}\right],$$

$$\frac{\partial L(X|\lambda)}{\partial \sigma_i^d} = \sum_{t=1}^{T} \gamma_t(i)\left[\frac{(x_t^d - \mu_i^d)^2}{(\sigma_i^d)^3} - \frac{1}{\sigma_i^d}\right]$$

where $\gamma_t(i)$ denotes the occupancy probability for $x_t$ to have been generated by Gaussian i and d-th dimension of a vector. The FC representation for an image would then be a concatenation of the partial derivatives. As such, the FV image representation represents its deviation from the visual vocabulary. Further details are described in citation [3] above.

Once the image representations are obtained, either a discriminative or a generative classifier can be used for classification (403 in FIG. 4). For discriminative classification, SVM's (Support Vector Machines) with linear kernals have shown to provide fairly high classification accuracy when FV's are used for image representation. The image database is split into a training and test set for each category. For each category, a classifier is trained in a one-versus-all mechanism. The classifiers are then used to score an image as belonging or not belonging to a particular class. The image is then labeled (404) corresponding to the classifier which provides its highest score.

Referring back to FIG. 3, step S302 determines if the object classifier achieved a given threshold confidence level. If multiple different types of object classifiers are employed, the system may look for the classifier with the highest achieved confidence level to make the determination. If the object classifier reaches the desired confidence level threshold, the object is labeled (S303) with the label determined in 404 of FIG. 4. On the other hand, if the object classifier did not result in reaching the given confidence level threshold, then the object class is determined to be "unknown" and the object is labeled as such at 5308.

Once the object has been labeled in S303, in step S304, material classifiers are utilized to compute a material label. Here, it is noted that the material classification is performed within each object category. Thus, the material classifiers are preferably designed for each type of object so that they would be more discriminative of the materials that each object type is typically made of. A similar process is performed in step S309, even though the object class is determined as "unknown." Therefore, in the case where the object class was identified (S303), material classifiers that are more specific to the particular object type can be used to attempt to classify the material of the object, whereas in step S309, a wider range of material classifiers would be needed since no object type was determined. It is noted however, that even though the object type may have been determined as "unknown", the object classifiers would nonetheless have resulted in at least some probability of the object belonging to various object classes. That is, the computed object class may have resulted in a 25% probability of the object being a bottle, and a 25% probability of the object being a cartridge, and say 10% for each of five other different object classes. If the threshold confidence level is set to 50%, for example, then no object class would be determined and the object would be labeled as unknown. However, since the highest probabilities obtained were for bottle and cartridge, the material classifiers used in S309 could be selected towards the object classes that resulted in the highest probabilities, even if the object classifier resulted in an unknown object class. Thus, in S304 and S309, material classifiers are applied within the object classes to attempt to classify the material of the object. An example material classification will now be explained with reference to FIG. 5.

Figure 5:
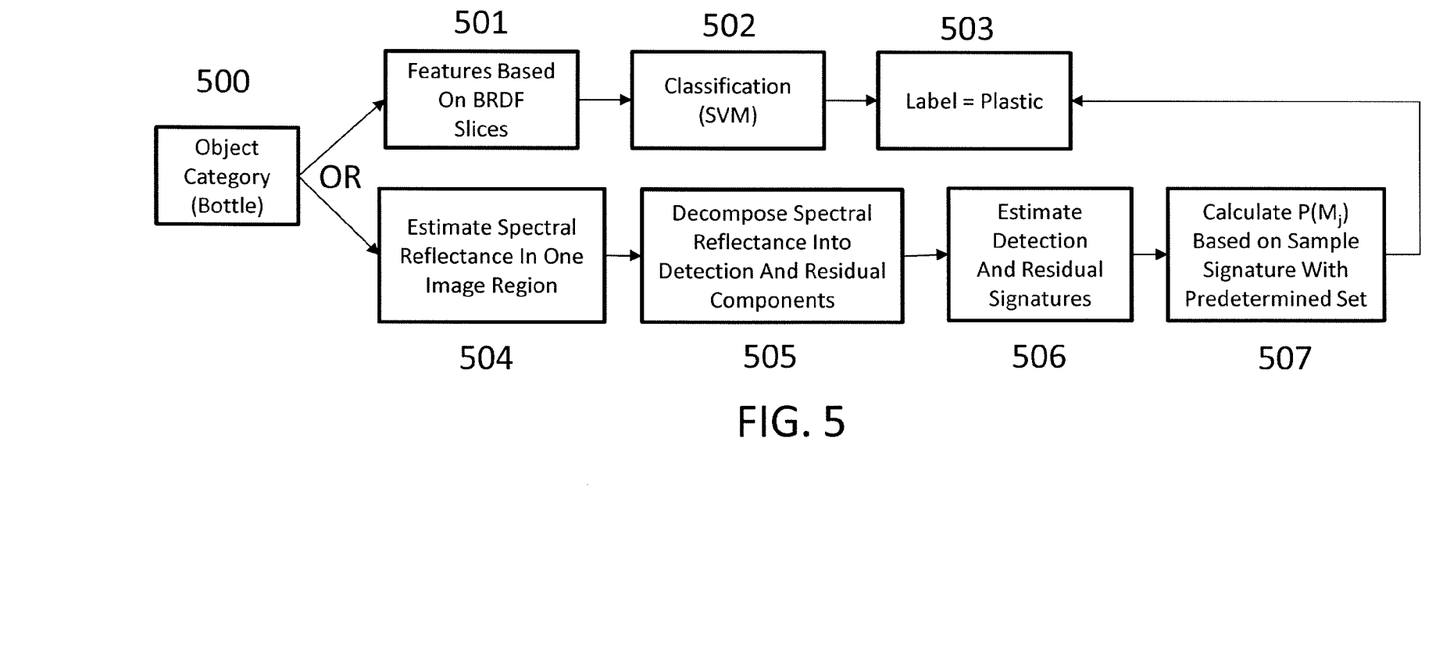
FIG. 5 depicts an example of two different material classifications for a given object category.

FIG. 5 depicts a framework for two possible material classifiers that may be used to classify the materials for the object class "bottle". The first approach uses a machine learning algorithm. In 501, feature vectors are obtained from slices captured at the same position with respect to the object, where the feature vectors can be BRDF-based computed within the visible wavelength range. BRDF is a 4D function which specifies the brightness observed in any outgoing direction, in 2D, when light arrives from any incoming direction, in 2D. Using the BRDF as compared with pixel intensity values of the 3D image allows for greater surface orientation invariance. Material classification using BRDF slices has been described in citation [4] above. Briefly, 2D BRDF slices are captured as compared with the 4D BRDF, which requires solving for the stereo correspondence between all cameras. The camera can be fixed for all slices, while the illumination can be changed. The feature vector used is the concatenation of the HSH (Hemispherical Harmonic) coefficient vectors (9 dimensional) for each pixel over the red, green and blue color channels. The HSH coefficients are computed based on measurements for pixels on the upper hemisphere in a spherical coordinate system. In 502, classification may be done via a SVM (Support Vector Machine) classifier, and the object's material is labeled (404).

Another possible material classifier may be based on spectral decomposition. This approach is described in detail in co-pending U.S. application Ser. No. 13/887,163, filed on May 3, 2013, entitled "Systems And Methods For Colorimetric And Spectral Material Estimation", the contents of which are hereby incorporated by reference. Briefly, in this approach, given an image captured over a number of channels, the spectral reflectance over a region is estimated (504). The reflectance is decomposed into detection and residual components (505). The signature of the reflectance is taken to be the coefficients, computed by projecting the components onto a set of basis functions predetermined in advance. The signatures are correlated with a set of signatures which are labeled by material type and available in advance (506). The probability $P(M_j)$ of a signature belonging to specific material type is thus calculated (507) and the object's material is labeled (503).

The approaches described are currently for flat surfaces, which implies that interreflections are considered to be minimal. Objects within the same category have the same geometry and therefore, similar interreflection models. Therefore, if interreflections were to be modeled and factored out before computing BRDF-based features or performing spectral decomposition, they would be similar within one object category. In addition, if interreflections were not modeled, the BRDF slices or other captured images would be more consistent within one object category due to fewer differences in the reflections and scattering of light rays. Therefore, the material classifier would be trained to discriminate between differences in material rather than other effects. As a result, better performance is obtained since the material classifiers are trained for one object category at a time.

Referring back to FIG. 3, once the material classifiers have been used to compute the material label for the object (either via S304 or S309), it is determined if the classified material probability meets the threshold confidence level (S305, S310). If YES in S305 or S310, then the object's material is labeled (S306, S311) and following S306, the classification process ends (S314). If NO in S305 or S310, then the object's material label is determined to be "unknown" (S307, S312). In the case where the object class was able to be determined (YES in S302), but the material class was not (NO in S307), or where the object class was not able to be determined (NO in S302), and either the material class was able to be determined (YES in S310) or was not able to be determined (NO in S310), an interdependent two-step framework with feedback connections process (S313) is used to attempt to determine the object class and/or the material class. This process will now be described in detail with regard to FIG. 6.

In a first step of the two-step framework, the probabilities of the object belonging to different object classes are calculated. For example, compute $\hat{P}=\{P_1, P_2, \ldots, P_n\}$, where $P_1$, $P_2$, ..., $P_n$ are the probabilities of the object belonging to classes $O_1, O_2, \ldots, O_n$, respectively. The probabilities can be computed using the SVM approach or a Bayesian approach, such as:

$$P_i = P(O_i / V_o) = \frac{P(V_o | O_i)P(O_i)}{P(V_o)}, i = 1, 2, \ldots, n$$

where: $V_o$ are the object specific features for the image.

$P(V_o|O_i)$ is the likelihood term which models the relationship between the object features and the object classes.

$P(O_i)$ is the prior model on the object class.

$P(V_o)$ is the normalization term which represents the probability of the object features.

In the second step, the material class probabilities for a given object are computed, given the computed object class probabilities. For example, the material class probabilities can be calculated as follows:

$$P(M_j | \hat{P}) = \frac{P(\hat{P} | M_j)P(M_j)}{P(\hat{P})}$$

where: $P(\hat{P}|M_j)$ is the likelihood term which models the relationship between the object class probability estimates and the material classes.

$P(M_j)$ is the prior model on the material class.

$P(\hat{P})$ is a normalization term which represents the probabilities of the object classes.

j=1, ... m, where m is the number of material classes.

Thus, the terms for both the object class (A) and material class (B) probabilities are computed as follows:

$$P(O_i) = \frac{1}{\alpha}\sum_{j=1}^{M} P(O_i, M_j) = \frac{1}{\alpha}\sum_{j=1}^{M} P(O_i | M_j)P(M_j) \quad (A)$$

where $\alpha$ is a normalization term and can be written as: $\alpha = \sum_{i=1}^{N} P(O_i)$ $$P(M_j) = \frac{1}{\beta}\sum_{i=1}^{N} P(M_j, O_i) = \frac{1}{\beta}\sum_{i=1}^{N} P(M_j | O_i)P(O_i) \quad (B)$$

where $\beta$ is a normalization term and can be written as: $\beta = \sum_{j=1}^{M} P(M_j)$ Utilizing the foregoing probability equations, the probability for the captured object belonging to respective object classes $P(O_i)$ can be calculated using the prior material class probability $P(M_j)$ and likewise, the probability of the object belonging to a particular material class $P(M_j)$ can be calculated using the prior object class probability $P(O_i)$. As a result, interdependence and feedback are incorporated into the calculations to provide a greater degree of accuracy in the probabilities. This process will be discussed in more detail in the example below.

Incorporated into the foregoing probability equations (A) and (B) are predetermined likelihood weighting functions $P(O_i|M_j)$ and $P(M_j|O_i)$. These likelihood weighting functions are set in advance in the classifier and can be taken to be a variant of the Bernoulli functions, which essentially would down weigh the negative class in the function when it has a probability higher than 0.5. This works well for the objects and materials considered since an object cannot be of two types or of two materials simultaneously. Thus, these functions are weighted according to known probabilities that, for example, a bottle may be more likely to be made of plastic than glass or metal and thus, the likelihood functions would weigh more towards plastic rather than glass or metal for the object class bottle. An example of some likelihood functions may be as follows.

For the object classifier equation (A), for two different object types ($O_i$, where i=1 (bottle) and i=2 (cartridge)) and two possible material types ($M_j$, where j=1 (plastic) and j=2 (glass)) may be as follows:

$$P(P_1|M_1) = P(O_1) * [1 - P(O_2)] \quad (1)$$

$$P(O_2|M_1) = P(O_2) * [1 - P(O_1)] \quad (2)$$

$$P(O_1|M_2) = 0.4 * P(O_1) * [1 - P(O_2)] \quad (3)$$

$$P(O_2|M_2) = 0.1 * P(O_2) * [1 - P(O_1)] \quad (4)$$

It is noted that equations (3) and (4) are weighted downward, since it can be assumed that it is less likely that an object is a bottle ($O_1$) if it is made of glass ($M_2$) and since it is very unlikely that an object is a cartridge ($O_2$) if it is made of glass ($M_2$). Of course, these are merely a couple of examples for two different object types and two possible material types for those objects.

Similar likelihood weighting functions are also incorporated for the material classifier. Some example weighting functions for the material classifier of equation (B) may be as follows:

$$P(M_1|O_1)=P(M_1)*[1-P(M_2)] \quad (5)$$

$$P(M_2|O_1)=0.2*P(M_2)*[1-P(M_1)] \quad (6)$$

$$P(M_1|O_2)=P(M_1)*[1-P(M_2)] \quad (7)$$

$$P(M_2|O_2)=0.1*P(M_2)*[1-P(M_1)] \quad (8)$$

Similar to the likelihood weighting functions for the object classifier, it can be seen that the likelihood weighting functions for the material classifier are weighted down. For example, as can be seen in equation (7) it is assumed that it is less likely that an object is made of glass ($M_2$) if it is a bottle ($O_1$), and in equation (8), it is assumed that it is very unlikely that an object is made of glass ($M_2$) if it is a cartridge ($O_2$).

An example object/material classification that uses interdependence and feedback connections will now be described with regard to FIG. 6, using the foregoing probability equations (A) and (B), the object likelihood weighting functions (1)-(4) and the material likelihood weighting functions (5)-(8).

Figure 6:
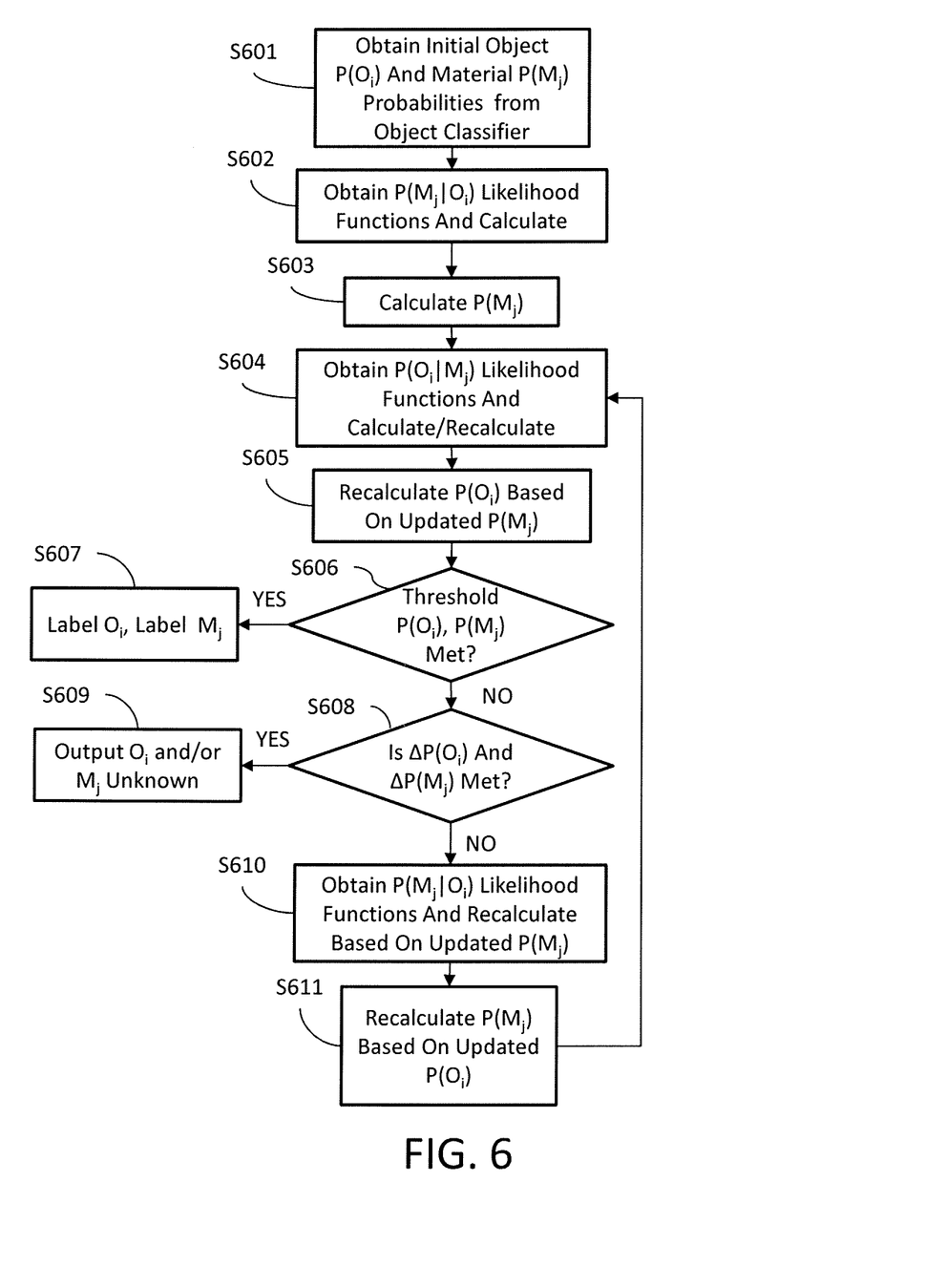
FIG. 6 is a flowchart of an interdependent object/material classifier with feedback connections according to the present disclosure.

Referring to FIG. 6, in a first step of an object/material classification process according to the present disclosure, as was discussed above, an image of an object is captured at classification station 20 and one or more object classifiers are employed to attempt to classify the object class and the material class of the object. Thus, initial probabilities of the object belonging to various different object classes and initial probabilities of the type of material that the object is made of are obtained in step S601 using the known object and/or material classifiers discussed above. In the present example, the object being classified is a plastic bottle. Thus, for the purposes of this example, it will be assumed that the known object classifiers (e.g., FIG. 4) are run first and resulted in a best case probability of 70% that the object is a bottle ($P(O_1)$=0.7) and a 30% probability that the object is a cartridge ($P(O_2)$=0.3). It is also assumed that the known material classifiers are run as described above (e.g., FIG. 5), and resulted in a best case probability of 50% that the object is made of plastic ($P(M_1)$=0.5) and a 50% probability that the object is made of glass ($P(M_2)$=0.5). In the present example, however, a desired threshold confidence level may be set to be 90% for each of the object classifier and the material classifier. Therefore, while the object classifier may have resulted in a 70% probability that the object is a bottle, this would not meet the threshold level. Likewise, a 50% probability for each of the plastic and glass materials would not meet the threshold. As a result, the present disclosure provides for implementing the two-step interdependent framework with feedback connections as follows in order to classify the object class and the material class to a greater degree of certainty.

Given the object probabilities from the initial classifier (i.e., $P(O_1)$=0.7 and $P(O_2)$=0.3), an attempt to further classify the material is conducted. Here, it is noted that the following description and the process depicted in FIG. 6 includes inputting the initial object probabilities and recalculating the material probabilities as a first part of a first iteration of the process. However, the process could also be designed instead to input the initial material probabilities and to recalculate the object probabilities as the first part of the first iteration. Of course, the remaining steps would be changed accordingly as well if the object probabilities were recalculated first. Since, however, the known object classifiers generally provide a greater degree of confidence for the initial object probabilities than the known material classifiers provide for the material probabilities, it is preferable to conduct the recalculation of the material probabilities as the first iteration using the somewhat more accurate initial object probabilities.

Once the initial object and material probabilities have been obtained in S601, the weighted material likelihood functions applicable for the two identified object classes (bottle and cartridge) and the two identified possible material classes (plastic and glass) are called. The initial material class probabilities are then used in the functions to calculate the weighting function. Thus, in the present example, equations (5)-(8) are called and the foregoing initial material probabilities (i.e., $P(M_1)$=0.5 and $P(M_2)$=0.5) are input. The results are as follows:

$$P(M_1|O_1)=P(M_1)*[1-P(M_2)]=0.5*[1-0.5]=0.25 \quad (5\text{-}1)$$

$$P(M_2|O_1)=0.2*P(M_2)*[1-P(M_1)]=0.2*0.5*[1-0.5]=0.05 \quad (6\text{-}1)$$

$$P(M_1|O_2)=P(M_1)*[1-P(M_2)]=0.5*[1-0.5]=0.25 \quad (7\text{-}1)$$

$$P(M_2|O_2)=0.1*P(M_2)*[1-P(M_1)]=0.1*0.5*[1-0.5]=0.025 \quad (8\text{-}1)$$

These material likelihood calculations are then used in equation (B) (step S603) to recalculate the material probabilities ($P(M_1)$ and $P(M_2)$) using the prior object probabilities (in this first iteration, the initial object probabilities $P(O_1)$=0.7 and $P(O_2)$=0.3). Thus, using equation (B) above and the results of equations (5-1)-(8-1), the following is determined:

$$P(M_1) = \frac{1}{\beta}\sum_{i=1}^{2} P(M_1, O_i) = \frac{1}{\beta}\sum_{i=1}^{2} P(M_1|O_i)P(O_i) = \frac{1}{\beta}((0.25*0.7)+(0.25*0.3)) = \frac{1}{\beta}0.25 \quad (\text{B-1a})$$

$$P(M_2) = P(M_2) = \frac{1}{\beta}\sum_{i=1}^{2} P(M_2, O_i) = \frac{1}{\beta}\sum_{i=1}^{2} P(M_2|O_i)P(O_i) = \frac{1}{\beta}(0.05*0.7)+(0.025*0.3) = \frac{1}{\beta}0.0425 \quad (\text{B-1b})$$

Using the material normalization term above, $\beta$=0.25+0.0425=0.2925, and therefore, the new material probabilities are calculated as:

$$P(M_1)=0.25/0.2925=0.85, \text{ and } P(M_2)=0.0425/0.2925=0.15.$$

Therefore, after the first iteration using interdependence, the new probabilities are 85% that the object is plastic and 15% that the object is glass. These new material probabilities are then input and used to recalculate the object probabilities using equation (A) above.

In the next step, the object weighted likelihood functions (1)-(4) are called (S604), and the prior object probabilities ($P(O_1)$=0.7 and $P(O_2)$=0.3) are input to calculate the object weighed functions. This process results in the following:

$$P(O_1|M_1)=P(O_1)*[1-P(O_2)]=0.7*[1-0.3]=0.49 \quad (1\text{-}1)$$

$$P(O_2|M_1)=P(O_2)*[1-P(O_1)]=0.3*[1-0.7]=0.09 \quad (2\text{-}1)$$

$$P(O_1|M_2)=0.4*P(O_1)*[1-P(O_2)]=0.4*0.7*[1-0.3]=0.196 \quad (3\text{-}1)$$

$$P(O_2|M_2)=0.1*P(O_2)*[1-P(O_1)]=0.1*0.3*[1-0.7]=0.009 \quad (4\text{-}1)$$

The calculated likelihood functions are then used in equation (A) above to determine the new object probabilities (step S605), which results in the following:

$$P(O_1) = \frac{1}{\alpha}\sum_{j=1}^{M} P(O_1, M_j) = \frac{1}{\alpha}\sum_{j=1}^{M} P(O_1 \mid M_j)P(M_j) = \quad \text{(A-1a)}$$

$$\frac{1}{\alpha}((0.49*0.85) + (0.196*0.15)) = \frac{1}{\alpha}0.4459$$

$$P(O_2) = \frac{1}{\alpha}\sum_{j=1}^{M} P(O_2, M_j) = \frac{1}{\alpha}\sum_{j=1}^{M} P(O_2 \mid M_j)P(M_j) = \quad \text{(A-1b)}$$

$$\frac{1}{\alpha}((0.09*0.85) + (0.009*0.15)) = \frac{1}{\alpha}0.7785$$

Using the object normalization term above, α=0.4459+0.0778=0.52375, and therefore, the new object probabilities are calculated as:

$P(O_1)$=0.4459/0.52375=0.85, and $P(O_2)$=007785/0.52375=0.15.

Therefore, after the first iteration using interdependence, the new probabilities are 85% that the object is a bottle and 15% that the object is a cartridge.

After the first iteration, a check can be performed to determine whether the first iteration resulted in the newly-calculated object and material probabilities meet the set threshold (step S606). If either of the new object or the material probabilities do not meet the threshold, then the process continues with another iteration. Here, a loop exit routine may be included in the process so that an indeterminate number of iterations does not occur in a continuous attempt to classify the object class or the material class if the threshold has not been met. As one example, a determination may be made whether an iteration counter may have reached a specified limit. As another example, in step S608, a check may be made whether the difference between the probabilities calculated between iterations has reached a point where a very small difference occurs, meaning that further iterations are unlikely to change the result and the threshold cannot be achieved. Of course, other means for ending a continuous loop of iterations could also be implemented and the invention is not limited to any one technique. If the routine has reached this point, then it is determined that the object and/or material cannot be classified and an output of "unknown" is made (step S609). On the other hand, if the thresholds have been met (YES in S606), then the object and the material are labeled (S607) and the label output is provided to the sorting module 160 for controlling to sort the object according to its object and material classifications.

In the case where the threshold has not yet been met (NO in S606) and where an indefinite loop situation has not occurred (NO in S608), the process proceeds to conduct a second iteration. In the second iteration, feedback is used in the classification process by using the prior-calculated material and object probabilities (i.e., the probabilities obtained in the first iteration) to recalculate the material and object probabilities. Thus, in step S610, the material likelihood functions (5)-(8) are called again, and the prior-calculated (first iteration) material probabilities are input to recalculate the second iteration $P(M_j|O_i)$. The result is as follows.

$$P(M_1|P_1)=P(M_1)*[1-P(M_2)]=0.85*[1-0.15]=0.7225 \quad (5\text{-}2)$$

$$P(M_2|O_1)=0.2*P(M_2)*[1-P(M_1)]=0.2*0.15*[1-0.85]=0.0045 \quad (6\text{-}2)$$

$$P(M_1|O_2)=P(M_1)*[1-P(M_2)]=0.85*[1-0.15]=0.7225 \quad (7\text{-}2)$$

$$P(M_2|O_2)=0.1*P(M_2)*[1-P(M_1)]=0.1*0.15*[1-0.85]=0.00225 \quad (8\text{-}2)$$

These material likelihood calculations are then used in equation (B) (step S611) to recalculate the material probabilities ($P(M_1)$ and $P(M_2)$) using the prior object probabilities (in this second iteration, the first iteration object probabilities $P(O_1)$=0.85 and $P(O_2)$=0.15). Thus, using equation (B) above and the results of equations (5-2)-(8-2), the following is determined:

$$P(M_1) = \frac{1}{\beta}\sum_{i=1}^{2} P(M_1, O_i) = \frac{1}{\beta}\sum_{i=1}^{2} P(M_1 \mid O_i)P(O_i) = \quad \text{(B-2a)}$$

$$\frac{1}{\beta}((0.7225*0.85) + (0.7225*0.15)) = \frac{1}{\beta}0.722$$

$$P(M_2) = \frac{1}{\beta}\sum_{i=1}^{2} P(M_2, O_i) = \frac{1}{\beta}\sum_{i=1}^{2} P(M_2 \mid O_i)P(O_i) = \quad \text{(B-2b)}$$

$$\frac{1}{\beta}(0.0045*0.85) + (0.00225*0.15)) = \frac{1}{\beta}0.004$$

Using the material normalization term above, β=0.722+0.004=0.726, and therefore, the new (second iteration) material probabilities are calculated as:

$P(M_1)$=0.722/0.726=0.99, and $P(M_2)$=0.004/0.726=0.005.

Therefore, after the second iteration using interdependence and feedback connections, the new probabilities are 99% that the object is plastic and <1% that the object is glass. These new material probabilities are then input and used to recalculate the object probabilities using equation (A) above.

In the next step, the object weighted likelihood functions (1)-(4) are called again (S604), and the prior object probabilities ($P(O_1)$=0.85 and $P(O_2)$=0.15 from the first iteration) are input to recalculate the object weighed functions. This process results in the following:

$$P(O_1|M_1)=P(O_1)*[1-P(O_2)]=0.85*[1-0.15]=0.7225 \quad (1\text{-}2)$$

$$P(O_2|M_1)=P(O_2)*[1-P(O_1)]=0.15*[1-0.85]=0.0225 \quad (2\text{-}2)$$

$$P(O_1|M_2)=0.4*P(O_1)*[1-P(O_2)]=0.4*0.85*[1-0.15]=0.289 \quad (3\text{-}2)$$

$$P(O_2|M_2)=0.1*P(O_2)*[1-P(O_1)]=0.1*0.15*[1-0.85]=0.00225 \quad (4\text{-}2)$$

The recalculated likelihood functions are then used in equation (A) above to determine the new object probabilities (step S605), which results in the following:

$$P(O_1) = \frac{1}{\alpha}\sum_{j=1}^{M} P(O_1, M_j) = \frac{1}{\alpha}\sum_{j=1}^{M} P(O_1 \mid M_j)P(M_j) = \quad \text{(A-2a)}$$

$$\frac{1}{\alpha}((0.7225*0.99) + (0.289*0.005)) = \frac{1}{\alpha}0.716$$

$$P(O_2) = \frac{1}{\alpha}\sum_{j=1}^{M} P(O_2, M_j) = \frac{1}{\alpha}\sum_{j=1}^{M} P(O_2 \mid M_j)P(M_j) = \quad \text{(A-2b)}$$

$$\frac{1}{\alpha}((0.0225*0.99) + (0.00225*0.005)) = \frac{1}{\alpha}0.022$$

Using the object normalization term above, α=0.716+ 0.022=0.738, and therefore, the new object probabilities are calculated as:

$P(O_1)$=0.716/0.738=0.97, and $P(O_2)$=0.022/0.738=0.03. Therefore, after the second iteration using interdependence and feedback connections, the new probabilities are 97% that the object is a bottle and 3% that the object is a cartridge.

After the second iteration, a check can be performed again to determine whether the second iteration resulted in the newly-calculated object and material probabilities meeting the set threshold (step S606). In the present example, it was assumed that the threshold was set at 90% for both the object classification and the material classification. Since the second iteration resulted in a 97% probability that the object is a bottle, and a 99% percent probability that the object is made of plastic, the object is labeled as a plastic bottle (S607) and the classification process ends for this object. The object/material label is then output to the sorting module 160. Sorting module 160 then issues sorting commands to sorting actuator 31 so that, when the object is conveyed by conveyor 12 to the sorting station 30, the actuator is controlled so as to sort the plastic bottle and place it into the appropriate receptacle, in this case, receptacle 41a. In a case where the object and/or material class cannot be classified and the object and/or material class is output as "unknown", the object is nonetheless conveyed to sorting station 30, where sorting module 160 controls sorting actuator 31 to sort the object into a receptacle identified for manual processing.

Among the advantages provided by the embodiments and description herein is the advantage of determining with a higher degree of certainty the object class of an object and the material class of the object. Such an advantage provides the ability to reduce the number of improperly sorted objects being placed in incorrect sorting bins that may result in an object not being able to be properly processed for recycling.

Although the foregoing description has been made with reference to particular embodiments, it can readily be understood that additional embodiments not described herein may be used to implement the claimed invention, without departing form the spirit or scope of the present disclosure.

What is claimed is:

1. A method of classifying an object, comprising:
a first phase comprising application of an object classifier to the object to obtain first object class probabilities of the object belonging to respective different object classes, and application of a material classifier to the object to obtain first material class probabilities of a material type of the object belonging to respective different material classes; and
a second phase comprising application of an interdependent object/material classifier to the first object probabilities to obtain further object class probabilities, and to the first material class probabilities to obtain further material class probabilities, so as to classify the object class and to classify the material type of the object,
wherein, the interdependent object/material classifier performs multiple iterations of calculating the further object class probabilities and multiple iterations of calculating the further material class probabilities, and
wherein, an immediately preceding calculated prior further object class probability is included in a next iteration of calculating a further material class probability, and an immediately preceding calculated prior further material class probability is included in a next iteration of calculating a further object class probability.

2. The method according to claim 1, further comprising, following each iteration of calculating the further object class probability, and each iteration of calculating the further material class probability, determining whether the respective object class and material class probabilities meet a predetermined probability value.

3. The method according to claim 2, wherein the iterations of the object/material classifier are terminated when it is determined that material class meets the predetermined probability value.

4. The method according to claim 2, wherein, in a case where it is determined that the predetermined probability value is not met, the interdependent object/material classifier continues the object class iterations and the material class iterations sequentially until a) it is determined that the value has been met, b) a predetermined number of iterations has been met, or c) a predetermined change amount in the probability between iterations has been met.

5. The method according to claim 1, wherein the first object class probabilities and the first material class probabilities are based on training data.

6. The method according to claim 1, wherein further probabilities calculated by the interdependent object/material classifier are calculated using a Bayesian approach.

7. The method according to claim 1, wherein the first object class probabilities and the first material class probabilities are calculated using a technique selected from a group which includes support vector machines (SVM), neural networks, Gaussian mixture modeling, and K-means clustering.

8. The method according to claim 1, wherein the object classifier in the first phase comprises derivation of descriptors followed by object classification using the descriptors.

9. The method according to claim 8, wherein the derivation of descriptors comprises derivation of low level descriptors including color and scale-invariant-feature-transformation (SIFT).

10. The method according to claim 8, wherein the derivation of descriptors includes derivation of high level descriptors including one of bag-of-visual-words (BOV) descriptors and Fisher vectors (FV).

11. The method according to claim 1, wherein the object classifier in the first phase is selected from a group which includes discriminative classification and generative classification.

12. The method according to claim 1, wherein the material classifier in the first phase comprises discriminative classification in which bidirectional reflectance distribution function (BRDF) features are extracted from the object followed by support vector machine (SVM) material classification based on the extracted BRDF features.

13. The method according to claim 1, wherein the material classifier in the first phase comprises discriminative classification in which spectral features are extracted from the object based on estimations of spectral reflectance from the object followed by probability calculations as to most likely material classification based on the extracted spectral features.

14. The method according to claim 1, wherein, the interdependent object/material classifier comprises application of a pre-defined set of object/material interdependent weighting functions for calculating the further object class probabilities, and application of a pre-defined set of material/object interdependent functions for calculating the further material class probabilities, and
wherein the pre-defined set of object/material interdependent weighting functions define a likelihood of a particular object being more or less likely to belong to a particular material class.

15. The method according to claim 1, wherein, the interdependent object/material classifier comprises application of a pre-defined set of object/material interdependent weighting functions for calculating the further object class probabilities, and application of a pre-defined set of material/object interdependent functions for calculating the further material class probabilities, and wherein the pre-defined set of material/object interdependent weighting functions define a likelihood of a particular material being more or less likely to belong to a particular object class.

16. A method of recycling objects, comprising the steps of:
conveying recyclable objects to a material classification position;
capturing an image of the recyclable objects;
classifying, according to the method of claim 1, the object class and the material class of the object in the captured image; and
sorting the recyclable objects according to their respective object and material classes as classified in the classifying step.

17. A system for recycling of objects, comprising:
a conveyor system for conveying recyclable objects to a material classification position;
an image capture device for capturing an image of the recyclable objects;
a classifying device for classifying, using the method according to claim 1, the object class and the material class of the object in the captured image; and
a sorting device for sorting the recyclable objects according to their respective object and material classes classified by the classifying device.

18. A non-transitory computer readable storage medium in which is stored computer executable code of a program that, when executed by a processor of a computer, causes the computer to execute the method according to claim 1.

* * * * *